United States Patent
Griffin

[11] 3,891,259
[45] June 24, 1975

[54] DEVICE FOR REMOVING COFFEE BASKET AND STEM

[75] Inventor: Vernon Dale Griffin, Midland, Tex.

[73] Assignee: Chancellor Chair Company, Midland, Tex. ; a part interest

[22] Filed: Sept. 13, 1973

[21] Appl. No.: 396,692

[52] U.S. Cl.................. 294/33; 294/1 R; 294/99 R
[51] Int. Cl. ........................................... A47j 45/10
[58] Field of Search............ 294/1 R, 19 R, 20, 25, 294/33, 61, 99 R, 131; 81/3 G, 3.41, 3.47, 3.48, 3.49, 3.8; 99/292, 310, 317; 220/25

[56] References Cited
UNITED STATES PATENTS

| 2,020,859 | 11/1935 | Spalding .............................. 99/317 |
| 2,826,980 | 3/1958 | Willman ........................ 294/99 R X |
| 3,071,403 | 1/1963 | Preu et al........................... 294/64 R |
| 3,166,349 | 1/1965 | Hagler ................................. 294/33 |
| 3,282,196 | 11/1966 | Manship et al. .................. 294/29 X |

Primary Examiner—Evon C. Blunk
Assistant Examiner—Johnny D. Cherry
Attorney, Agent, or Firm—Clarence A. O'Brien; Harvey B. Jacobson

[57] ABSTRACT

An elongated tapered shaft mounting an open-ended heat resistant elastomeric sleeve. The shaft is insertable within the upper discharge end of a perk stem so as to preclude flow therefrom with the sleeve being centered about the stem so as to enable an insulated grasping thereof for a withdrawal of the stem and basket.

6 Claims, 4 Drawing Figures

PATENTED JUN 24 1975  3,891,259
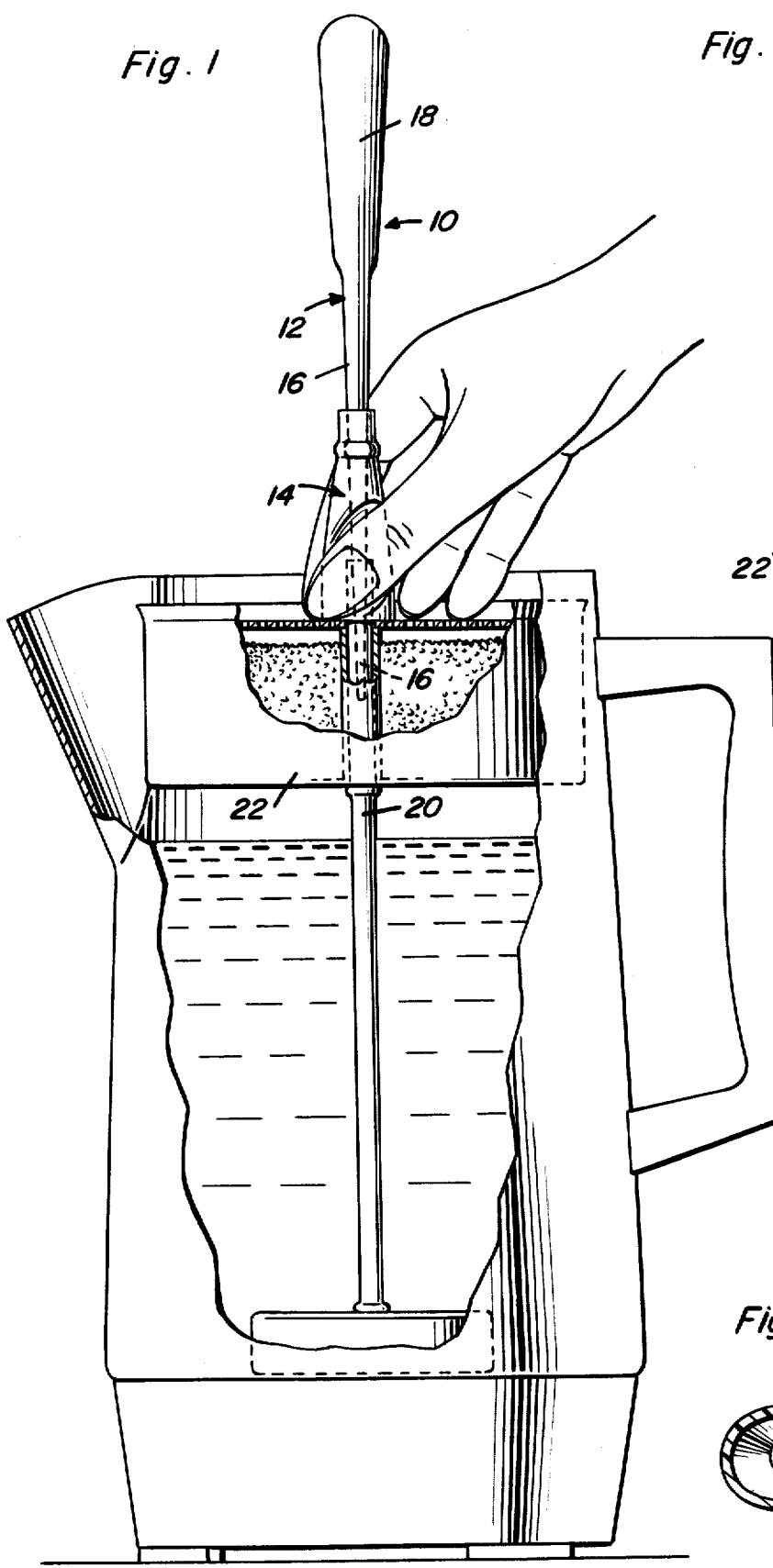
Fig. 1
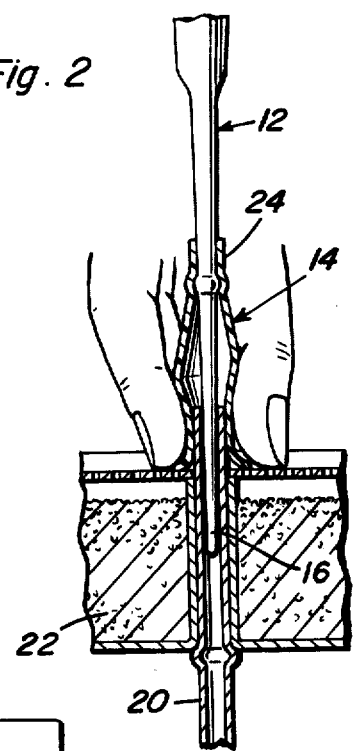
Fig. 2
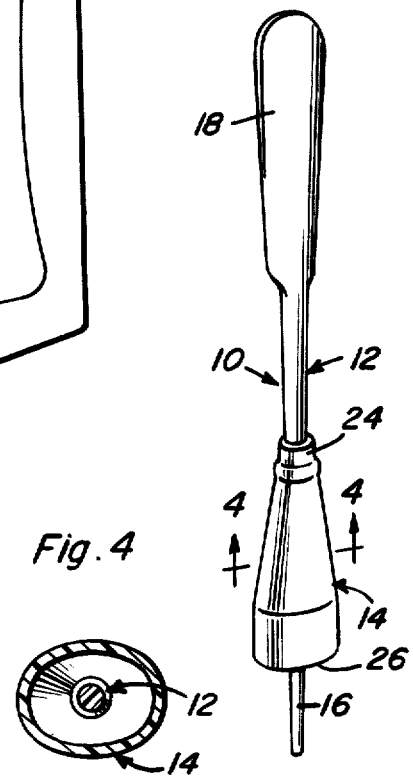
Fig. 3
Fig. 4

DEVICE FOR REMOVING COFFEE BASKET AND STEM

The present invention is generally concerned with coffee making apparatus of the type incorporating a hollow upwardly discharging perk stem and a surrounding coffee basket mounted thereon. More particularly, the invention is directed to a device for enabling a grasping and removal of the stem and basket subsequent to the perking process and without danger to the user.

The desirability of removing the stem and coffee basket at the completion of the perking cycle or process is to avoid a reperking of the coffee which would adversely affect the flavor of the coffee. However, the stem and basket, at this point, are extremely hot and thus difficult to safely handle, both because of the heat and the tendency for an occasional upward bubbling of the boiling water through the stem.

Accordingly, the present invention was devised and comprises a shaft which safely seals the upper discharge end of the hollow perk stem and positions a heat insulating sleeve about the exterior of the stem above the basket. The sleeve can be easily manipulated so as to effectively grasp the stem and safely raise the stem and basket for disposal, for example into a sink.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is an elevational view, with portions broken away, illustrating the use of the device of the invention;

FIG. 2 is a cross-sectional view through the device in operative engagement with a perk stem;

FIG. 3 is a perspective view of the device; and

FIG. 4 is a cross-sectional view through the device taken substantially on a plane passing along line 4—4 in FIG. 3.

Referring now more specifically to the drawings, reference numeral 10 is used to generally designate the device or implement comprising the invention.

The device 10 consists basically of an elongated rigid stem 12 and a flexible sleeve 14 mounted on the shaft 12.

The shaft 12 has an elongated slightly tapered body portion 16 and a flattened slightly enlarged handle forming upper portion 18. The taper of the body portion 16 is significant in aiding the insertion of the shaft 12 into the open upper discharge end of a conventional coffee pot perk stem 20, normally surrounded by and mounting the coffee receiving basket 22. The taper allows for an accommodation of the shaft 12 to different size perk stems 20. That is, the body portion 16 of the shaft 12, because of its taper, can be accommodated in a wide range of different diameter stems, in each instance being inserted to a depth sufficient so as to close off the upper discharge end of the stem 20 and preclude any possible accidental discharge of heated water as the stem 20 and basket 22 are being removed.

The sleeve 14 has a reduced upper portion 24 which is snugly received about the body portion 16 of the shaft 12 and frictionally locked into position thereon. The sleeve 14 flares downwardly and terminates in an enlarged open lower end 26 which, as will be readily appreciated from FIGS. 1 and 2, is received over the exterior of the stem to provide a heat insulating gripping cover therefor. The sleeve 14, as will be readily appreciated, is flexible and of an appropriate heat insulating material. The shaft 12 itself is also of an appropriate material unaffected by the amount of heat which can normally be anticipated. The sleeve 14, through its frictional engagement with the shaft 12, can be vertically adjusted therealong so as to adapt the device 10 to the particular coffee maker involved. Further, it is preferable that the lower tapered portion of the shaft 12 extend to at least the lower open end 26 of the sleeve 14, and preferably a distance therebelow as illustrated in the drawings so as to facilitate a proper and rapid mounting of the device. The sleeve 14, in addition to providing a convenient and safe means for grasping the upper projecting end of the perk stem 20, also provides a closed cover means therefor so as to form an additional guard against any unexpected upward discharge of water through the perk stem 20.

In use, after the coffee has been perked, the coffee maker is removed from the heat source and the perking allowed to cease. The lid is then removed and the instrument 10 positioned over the upper projecting end of the stem 20 with the stem being grasped and upwardly raised along with the coffee basket 22 for removal from the coffee maker.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A device for removing the coffee basket and stem from coffee making apparatus, said device comprising an elongated shaft, a manually flexible gripping sleeve mounted generally coaxially on and completely about said shaft, said sleeve having a first end engaged about and sealed to said shaft and a second enlarged end positionable about the perk stem of coffee making apparatus and selectively manually flexible into gripping engagement with the stem, said shaft projecting through said sleeve to at least the second end of the sleeve, the shaft being selectively introducible into the upper discharge end of a perk stem with the sleeve positioned in surrounding relation to said perk stem.

2. The device of claim 1 wherein said shaft is straight and tapered from a minimum cross-sectional size at the end thereof adjacent the enlarged second end of the sleeve for reception within and sealing of perk stems of different diameters.

3. The device of claim 2 wherein said shaft projects substantially beyond the first end of said sleeve to provide a handle means for the device.

4. The device of claim 3 wherein said sleeve is longitudinally adjustable on and along said shaft.

5. The device of claim 2 wherein said sleeve is longitudinally adjustable on and along said shaft.

6. The device of claim 1 wherein said sleeve is elongated and, prior to manual flexing flares outwardly from the first shaft engaged end to the second end portion.

* * * * *